Feb. 2, 1965 S. T. MEYERS 3,168,649

SHIFT REGISTER EMPLOYING BISTABLE MULTIREGION SEMICONDUCTIVE DEVICES

Filed Aug. 5, 1960

INVENTOR
S. T. MEYERS
BY R. B. Ardis
ATTORNEY

United States Patent Office 3,168,649 Patented Feb. 2, 1965

3,168,649

SHIFT REGISTER EMPLOYING BISTABLE MULTI-REGION SEMICONDUCTIVE DEVICES

Stanley T. Meyers, East Orange, N.J., assignor to Bell Telephone Laboratories, Incorporated, New York, N.Y., a corporation of New York Filed Aug. 5, 1960, Ser. No. 47,760
6 Claims. (Cl. 307—88.5)

This invention relates generally to registers and more particularly to shift registers employing junction type semiconductive devices as active elements.

In general shift registers are composed of a chain of interconnected binary counters. In the past, some shift registers have employed junction transistor binary counters having at least two transistors with rather complex coupling circuitry between them. While generally satisfactory, shift registers making use of such binary counters have tended to be limited in their application because of the complexity involved in each binary counter.

It is an object of this invention, therefore, to reduce the over-all complexity of transistor shift registers.

Other shift registers have employed single point-contact transistor binary counters, but this type of shift register tends to be limited in application due to the heavy requirements imposed for shifting each stage of the shift register from the high current state to the low current state. When the point contact transistor is operating in its high current state, the transition back to its low current state is not regenerative in nature. In order for the transistor to be shifted to its low current state, therefore, an input pulse must be applied to the base-emitter circuit of sufficient magnitude to entirely cancel the base-emitter current which is flowing. This necessity for relatively high biasing voltages and currents, however, may cause interaction between the stages of a shift register employing such point-contact transistor binary counters unless complicated and expensive circuitry is employed between the stages. In addition, because the input impedance of a point-contact transistor circuit is, in general, lower than the output impedance, cascading is difficult from the standpoint of impedance matching.

It is, therefore, an object of this invention to reduce the requirements for coupling single transistor binary counters to form a shift register.

In accordance with this invention bistable multiregion semiconductive devices together with associated circuitry form the stages of a shift register, with the state of a preceding stage being transferred to its succeeding stage by injecting a current of proper polarity into the base electrode of the succeeding stage.

The bistable multiregion semiconductive device employed may be the avalanche transistor described by J. J. Ebers and S. L. Miller in "Alloyed Junction Avalanche Transistors," vol. 34, Bell System Technical Journal, September 1955, page 883. The avalanche transistor is capable of assuming either of two stable states when a voltage applied between the collector and emitter electrodes exceeds a predetermined breakdown voltage. Where such a voltage is applied, a small current of the right polarity injected into the base-emitter circuit forward biases the base-emitter junction and causes a high current to flow in the collector-emitter circuit. This high collector-emitter current flows even after the removal of the forward biasing current, and continues to flow until a reverse current, whose polarity is opposite that of the forward current, is injected into the base-emitter circuit. Because the avalanche transistor is used in a circuit providing negative feedback between the emitter and base circuits, the turn-off process is cumulative in nature and the turn-off current may be small in comparison with the high collector-emitter current it is to shut off.

The P-N-P-N transistor triode described by I. M. Mackintosh in vol. 46 of the Proceedings of the I.R.E., June 1958, pages 1229–1235, may also be employed. In a manner similar to the operation of the avalanche transistor the P-N-P-N transistor triode can assume either of two D.-C. states when the supply voltage to the outer regions exceeds the breakdown voltage. For present purposes, the electrode of the outer region at which current enters the transistor from the external circuit shall be designated the emitter electrode. The second outer region supplies current to the external circuit and for present purposes the electrode attached to that region shall be designated as the collector electrode.

The invention will be more fully understood from the following detailed description taken in conjunction with the drawings, in which.

Figure 1:
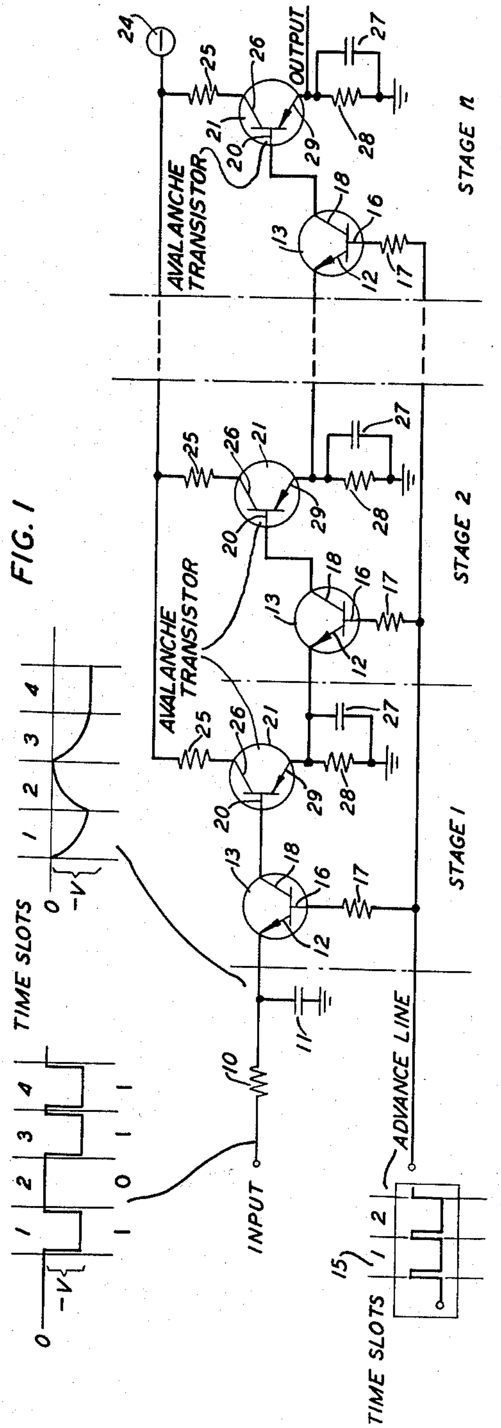
FIG. 1 is a schematic diagram of a shift register embodying the invention.

A shift register embodying the invention is shown in FIG. 1. To understand the operation of such a shift register, assume that the binary number 1011 is to be registered therein; the pulse input signal will therefore be as is indicated to the left of the input terminal in FIG. 1. The input signal is first applied to an integrating circuit consisting of a resistor 10 and capacitor 11 with the output of the integrating circuit, taken across the capacitor 11, being applied to the emitter 12 of a switching transistor 13. As is well known, an input pulse to an integrating circuit results in an output which starts from zero and rises to a value whose ultimate maximum is the maximum voltage of the input pulse, with the rise time determined by the time constant of the integrating circuit. Similarly the removal of an input signal from the input of an integrating circuit results in the decay of the output voltage toward an ultimate value of zero. Because of these well-known characteristics the voltage at the output of the integrating circuit in response to the binary number 1011 will be as indicated in FIG. 1. At the beginning of the first time slot the output voltage will still be close to zero since the time constant of the integrating circuit is of the order of magnitude of about .75 of a time slot. At the end of the first time slot and the beginning of the second time slot the output voltage will be close to the maximum negative voltage, —V, of the negative input pulse. During the second time slot the integrator output voltage will decay toward zero voltage because there is no voltage applied to the integrator input. In response to the negative input pulse occurring during the third and fourth time slots the integrator output voltage rises, as indicated, to a value close to —V.

A source of advance pulses 15 is connected to the bases 16 of a series of transistor switches 13 by means of resistors 17. Each switching transistor 13 is of the N-P-N type and a positive going advance pulse whose base line is clamped to a negative voltage base will cause each transistor switch 13 to conduct during the presence of the advance pulse, which condition is designated as the closed condition of switch 13. The collector 18 of each switching transistor 13 is connected to the base 20 of a succeeding avalanche transistor 21. Assume all the avalanche transistors 21 to be in an initial condition of no conduction, i.e., the low current state. In accordance with the invention, there is injected into the base 20 of the avalanche transistor 21 of the first stage at the beginning of the second time slot a current indicative of the digit which appeared at the input to the shift register during the first time slot. This is accomplished by the closure of switch 13 of the first stage by the advance pulse at the beginning of the second time slot with the negative integrator output voltage injecting a forward biasing current into the base-emitter circuit of the first stage avalanche transistor 21. Since the source of negative voltage 24 connected by means of resistor 25 to the collector 26 of each avalanche transistor 21 exceeds the collector-emitter breakdown voltage, a high collector-emitter current flows in the avalanche transistor of the first stage. This current continues to flow in the collector-emitter circuit of the avalanche transistor 21 of the first stage until, in accordance with the invention, a current indicative of the digit in the second time slot of the input signal is injected into the base 20 of the avalanche transistor of the first stage. During the second time slot the voltage appearing across capacitor 27 and resistor 28 connected between the emitter 29 of the avalanche transistor of the first stage and ground has risen as a result of the high collector-emitter current flow. The closure of the transistor switch 13 of the first stage at the beginning of the third time slot provides a negative feedback path from the emitter 29 to the base 20 of the avalanche transistor 21 of the first stage, and because no voltage is present at the base 20 of the avalanche transistor 21 the avalanche transistor of the first stage shuts itself off by means of negative feedback from emitter to base. The feedback path from the emitter 29 to the base 20 of the avalanche transistor 21 comprises the parallel combination of resistor 28 and capacitor 27, the path through ground to the grounded terminal of capacitor 11, and thence through the emitter-collector circuit of transistor 13 to the base 20 of the avalanche transistor. In accordance with the invention the third stage has had, at the beginning of the third time slot, injected into its base a current indicative of the state of the first stage during the preceding time slot. Specifically, the negative voltage appearing across resistor 28 and capacitor 27 of the first stage is applied to the base 20 of the avalanche transistor 21 of the second stage by the closure of the transistor switch 13 of the second stage, injecting into the base-emitter circuit of the avalanche transistor 21 of the second stage a forward biasing current which results in the avalanche transistor 21 of the second stage assuming its high current state. Similarly, in accordance with the invention, avalanche transistor 21 of the second stage is driven into its low current state at the beginning of the fourth time slot by the fact that there is no voltage between the emitter 29 and ground of the avalanche transistor 21 of the first stage at that time, and negative feedback between emitter and base of the avalanche transistor of the second stage drives that avalanche transistor to its low current state.

In the same manner, there is injected into the base of the avalanche transistor of the first stage a forward biasing current at the beginning of the fourth and fifth time slots, and a forward biasing current is injected into the base of the avalanche transistor of the second stage at the beginning of the fifth and sixth time slots.

To fully register the binary number occupying $n$ time slots would require an $n$ stage shift register. To read out the registered number, $n$ advance pulses would be applied to the register by source 15, and the original number will appear at the output terminal connected to the emitter 29 of the $n$th stage.

The particular embodiment of the invention registers numbers where a "1" is represented by a negative going pulse and a "0" by no voltage. If it is desired to register a number wherein a "1" is represented by a positive going pulse and a "0" by no voltage, the switching transistors 13 should be of the P-N-P type and the avalanche transistor of an N-P-N type. It is also required that source 15 be a source of negative going pulses and that the advance pulses have their bases clamped to zero voltage.

Figure 2:
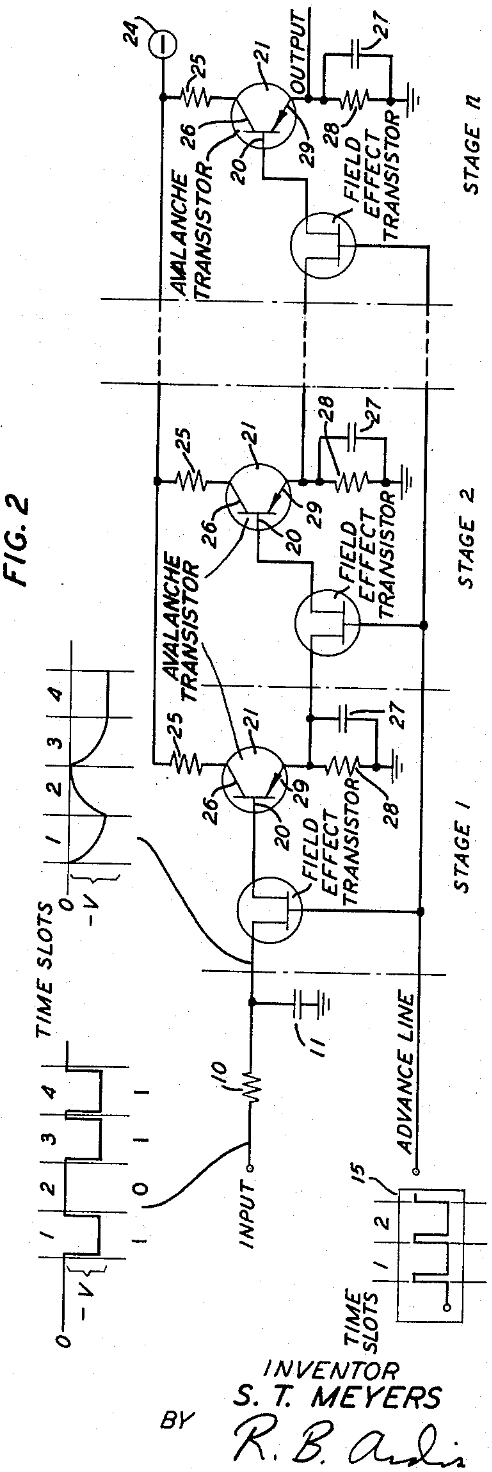
FIG. 2 is a schematic diagram of a second shift register embodying the invention.

FIG. 2 illustrates a second embodiment of the invention wherein the switches employed are field effect transistors described by G. C. Dacey and I. M. Ross in "The Field Effect Transistor," Bell System Technical Journal, vol. 34, November 1955, pages 1149–1159. The operation of the current shown in FIG. 2 is the same as described in connection with FIG. 1 except that the need for the resistor 17 in the connection of each switch 13 to the source of advance pulses 15 is eliminated. These resistors were required in the circuit shown in FIG. 1 to provide decoupling between the stages. Because of the field effect and its resulting lack of direct connection between stages these resistors are no longer required.

The shift registers shown in FIGS. 1 and 2 use an avalanche transistor as the multiregion bistable semiconductive device. As described above, a P-N-P-N transistor triode of the type described by I. M. Mackintosh in the above-recited article may be directly substituted for the avalanche transistor in the circuits shown with the base similarly controlling the condition of the internal path (between collector and emitter) of the device at all times.

It is to be understood that the above-described arrangements are illustrative of the application of the principles of the invention. Numerous other arrangements may be devised by those skilled in the art without departing from the spirit and scope of the invention.

What is claimed is:

1. A shift register comprising, in combination, a plurality of registers each comprising, a three terminal bistable multiregion device having an emitter electrode, a collector electrode, a base electrode, a predetermined collector-emitter breakdown voltage, and means to supply a collector-emitter voltage in excess of said breakdown voltage, a source of two state input signals comprising pulses and spaces to be registered, direct current coupled switching means to inject a forward biasing current into the base of a first of said multiregion semiconductive devices in response to a first state of said input signal, whereby said first device switches into its high collector-emitter current state and remains there even after removal of said forward biasing current, feedback means to inject a reverse biasing current into the base of said first device in response to a second state of said input signal, whereby said semiconductive device switches back into its low collector-emitter current state, direct current coupled switching means connected between the emitter electrode of each preceding semiconductive device and the base electrode of the succeeding device, means to enable each of said switching means at predetermined spaced intervals, and means to inject a current indicative of the state of the immediately preceding one of said devices into its immediately succeeding device during said intervals to cause the succeeding device to assume the state which existed at the preceding device.

2. A shift register comprising, in combination, a plurality of registers each comprising, a three terminal bistable multiregion semiconductive device having an emitter electrode, a collector electrode, a base electrode, a predetermined collector-emitter breakdown voltage, and means to supply a collector-emitter voltage in excess of said breakdown voltage, a source of two state input signals comprising pulses and spaces to be registered, integrating means, direct current coupled switching means having a first terminal connected to the output of said integrating means and a second terminal connected to said base electrode of a first of said multiregion devices to inject a forward biasing current into the base of a first of said multiregion semiconductive devices in response to said first state of said input signal, whereby said first device switches into its high collector-emitter current state and remains there even after removal of said forward biasing current, feedback means connected between said emitter electrode of said first device and said first terminal of said direct current coupled switching means to inject a reverse biasing current into the base of said first device in response to a second state of said input signal, whereby said semiconductive device switches back into its low collector-emitter current state, direct current coupled switching means connected between the emitter electrode of each preceding semiconductive device and the base electrode of the succeeding device, means to enable each of said switching means at predetermined spaced intervals, and means to inject a current indicative of the state of the immediately preceding one of said devices into its immediately succeeding device during said intervals to cause the succeeding device to assume the state which existed at the preceding device.

3. A shift register comprising, in combination, a plurality of registers each comprising, an avalanche transistor having an emitter electrode, a collector electrode, a base electrode, a predetermined collector-emitter breakdown voltage, and means to supply a collector-emitter voltage in excess of said breakdown voltage, a source of two state input signals comprising pulses and spaces to be registered, direct current coupled switching means to inject a forward biasing current into the base of a first of said avalanche transistors in response to a first state of said input signal, whereby said first avalanche transistor switches into its high collector-emitter current state and remains there even after removal of said forward biasing current, feedback means to inject a reverse biasing current into the base of said first transistor in response to a second state of said input signal, whereby said avalanche transistor switches back into its low collector-emitter current state, direct current coupled switching means connected between the emitter electrode of each preceding avalanche transistor and the base electrode of the succeeding avalanche transistor, means to enable each of said switching means at predetermined spaced intervals, and means to inject a current indicative of the state of the immediately preceding one of said avalanche transistors into its immediately succeeding avalanche transistor during said intervals to cause the succeeding transistor to assume the state which existed at the preceding transistor.

4. A shift register comprising, in combination, a plurality of registers each comprising, an avalanche transistor having an emitter electrode, a collector electrode, a base electrode, a predetermined collector-emitter breakdown voltage, and means to supply a collector-emitter voltage in excess of said breakdown voltage, a source of two state input signals comprising pulses and spaces to be registered, integrating means, direct current coupled switching means having a first terminal connected to the output of said integrating means and a second terminal connected to said base electrode of a first of said avalanche transistors to inject a forward biasing current into the base of said first of said avalanche transistors in response to a first state of said input signal, whereby said first avalanche transistor switches into its high collector-emitter current state and remains there even after removal of said forward biasing current, feedback means connected between said emitter electrode of said first avalanche transistor and said first terminal of said direct current coupled switching means to inject a reverse biasing current into the base of said first transistor in response to a second state of said input signal, whereby said avalanche transistor switches back into its low collector-emitter current state, direct current coupled switching means connected between the emitter electrode of each preceding avalanche transistor and the base electrode of the succeeding avalanche transistor, means to enable each of said switching means at predetermined spaced intervals, and means to inject a current indicative of the state of the immediately preceding one of said avalanche transistors into its immediately succeeding avalanche transistor during said intervals to cause the succeeding transistor to assume the state which existed at the preceding transistor.

5. A shift register comprising, in combination, a plurality of registers each comprising, a P-N-P-N transistor triode having an emitter electrode, a collector electrode, a base electrode, a predetermined collector-emitter breakdown voltage, and means to supply a collector-emitter voltage in excess of said breakdown voltage, a source of two state input signals comprising pulses and spaces to be registered, direct current coupled switching means to inject a forward biasing current into the base of a first of said triodes in response to a first state of said input signal, whereby said first triode switches into its high collector-emitter current state and remains there even after removal of said forward biasing current, feedback means to inject a reverse biasing current into the base of said first triode in response to a second state of said input signal, whereby said triode switches back into its low collector-emitter current state, direct current coupled switching means connected between the emitter electrode of each preceding triode and the base electrode of the succeeding triode, means to enable each of said switching means at predetermined spaced intervals, and means to inject a current indicative of the state of the immediately preceding one of said triodes into its immediately succeeding triode during said intervals to cause the succeeding triode to assume the state which existed at the preceding triode.

6. A shift register comprising, in combination, a plurality of registers each comprising, a P-N-P-N transistor triode having an emitter electrode, a collector electrode, a base electrode, a predetermined collector-emitter breakdown voltage, and means to supply a collector-emitter voltage in excess of said breakdown voltage, a source of two state input signals comprising pulses and spaces to be registered, integrating means, direct current coupled switching means having a first terminal connected to the output of said integrating means and a second terminal connected to said base electrode of a first of said triodes to inject a forward biasing current into the base of said first of said triodes in response to a first state of said input signal, whereby said first triode switches into its high collector-emitter current state and remains there even after removal of said forward biasing current, feedback means connected between said emitter electrode of said first triode and said first terminal of said direct current coupled switching means to inject a reverse biasing current into the base of said first triode in response to a second state of said input signal, whereby said triode switches back into its low collector-emitter current state, direct current coupled switching means connected between the emitter electrode of each preceding triode and the base electrode of the succeeding triode, means to enable each of said switching means at predetermined spaced intervals, and means to inject a current indicative of the state of the immediately preceding one of said triodes into its immediately succeeding triode during said intervals to cause the succeeding triode to assume the state which existed at the preceding triode.

References Cited in the file of this patent

UNITED STATES PATENTS

| | | |
|---|---|---|
| 2,909,705 | Husson | Oct. 20, 1959 |
| 2,967,250 | Druker et al. | Jan. 3, 1961 |
| 2,987,633 | Pallas | June 6, 1961 |
| 3,036,225 | Kladde | May 22, 1962 |
| 3,047,739 | De Miranda | July 31, 1962 |
| 3,054,000 | Meyers | Sept. 11, 1962 |
| 3,054,907 | Payton et al. | Sept. 18, 1962 |

OTHER REFERENCES

Electronic Engineering, May 1959, article, "Avalanche Transistors," by Macario, pp. 262–267.